US012782016B2

(12) United States Patent
Hagen et al.

(10) Patent No.: US 12,782,016 B2
(45) Date of Patent: Nov. 3, 2026

(54) VARIABLE REFRIGERANT FLOW ASSEMBLY WITH QUICK CONNECTION AND SERVICEABLE FILTER

(71) Applicant: Oetiker NY, Inc., Lancaster, NY (US)

(72) Inventors: Kristian James Hagen, Gasport, NY (US); Kari Ann Sausen, Clarence, NY (US)

(73) Assignee: Oetiker NY, Inc., Lancaster, NY (US)

( * ) Notice: Subject to any disclaimer, the term of this patent is extended or adjusted under 35 U.S.C. 154(b) by 123 days.

(21) Appl. No.: 18/787,244

(22) Filed: Jul. 29, 2024

(65) Prior Publication Data

US 2025/0085037 A1 Mar. 13, 2025

Related U.S. Application Data

(60) Provisional application No. 63/581,734, filed on Sep. 11, 2023.

(51) Int. Cl.

*F25B 41/40* (2021.01)
*F16L 55/24* (2006.01)
*F25B 41/20* (2021.01)

(52) U.S. Cl.

CPC .............. *F25B 41/40* (2021.01); *F16L 55/24* (2013.01); *F25B 41/20* (2021.01)

(58) Field of Classification Search

CPC .......... F25B 41/40; F25B 41/20; F25B 41/42; F16L 21/02; F16L 37/14; F16L 55/24; F16L 43/003; F16L 37/142; F16L 37/144; F16L 37/1225

See application file for complete search history.

(56) References Cited

U.S. PATENT DOCUMENTS

| | | | | |
|---|---|---|---|---|
| 6,938,437 | B2 * | 9/2005 | Velez | F16L 19/065 210/232 |
| 7,938,452 | B2 * | 5/2011 | Katsura | F16L 47/041 137/550 |
| 10,549,221 | B2 * | 2/2020 | Kury | F16L 55/24 |
| 10,947,938 | B2 * | 3/2021 | French | F02M 35/10354 |
| 11,035,505 | B2 * | 6/2021 | Clapper | F16L 37/14 |

(Continued)

FOREIGN PATENT DOCUMENTS

| | | | | |
|---|---|---|---|---|
| EP | 2618036 | A2 * | 7/2013 | F16L 55/24 |
| JP | 11230477 | A | 8/1999 | |

(Continued)

OTHER PUBLICATIONS

Machine Translation EP2618036A2 (Year: 2013).*

*Primary Examiner* — Michael R Reid

(74) *Attorney, Agent, or Firm* — Harter Secrest & Emery LLP; Michael Nicholas Vranjes

(57) ABSTRACT

A variable refrigerant flow assembly including a housing including a first wall, the first wall including a first hole, a piping network arranged in the housing, the piping network including at least one valve and at least one manifold, a first tube connected to the manifold and extending through the first hole, a connector body removably connectable to the first tube, including a first end arranged to engage the first tube, a second end, a first through-bore extending from the first end to the second end, a first radially inward facing surface, and a first radially outward facing surface, and a filter removably arranged in the connector body.

17 Claims, 10 Drawing Sheets

(56) References Cited

U.S. PATENT DOCUMENTS

| | | | | |
|---|---|---|---|---|
| 2019/0093931 | A1* | 3/2019 | Kinoshita | F25B 41/26 |
| 2022/0205693 | A1* | 6/2022 | Ikari | F25B 5/02 |

FOREIGN PATENT DOCUMENTS

| | | | |
|---|---|---|---|
| JP | 200254749 | A | 2/2002 |
| WO | 2019089090 | A1 | 5/2019 |
| WO | 2022256757 | A1 | 12/2022 |

* cited by examiner

VARIABLE REFRIGERANT FLOW ASSEMBLY WITH QUICK CONNECTION AND SERVICEABLE FILTER

CROSS-REFERENCE TO RELATED APPLICATIONS

This application claims the benefit under 35 U.S.C. § 119(e) of U.S. Provisional Application No. 63/581,734, filed Sep. 11, 2023, which application is incorporated herein by reference in its entirety.

FIELD

The present disclosure relates to variable refrigerant flow assemblies, and more particularly, to a variable refrigerant flow assembly including fluid connection assemblies having a serviceable filter, allowing quick assembly, disassembly, and serviceability of components.

BACKGROUND

A variable refrigerant flow system, also known as a variable refrigerant volume system, is a heating, ventilation, and air conditioning (HVAC) that uses refrigerant as the primary cooling and heating medium, and is usually less complex than conventional chiller-based systems. This refrigerant is conditioned by one or more condensing units (which may be outdoors or indoors, water or air cooled), and is circulated within the building to multiple indoor units. Variable refrigerant flow systems, unlike conventional chiller-based systems, allow for varying degrees of cooling in more specific areas (because there are no large air handlers, only smaller indoor units), may supply hot water in a heat recovery configuration without affecting efficiency, and can switch to heating mode (heat pump) during winter without additional equipment, all of which may allow for reduced energy consumption. Also, air handlers and large ducts are not required which can reduce the height above a dropped ceiling as well as structural impact as variable refrigerant flow uses smaller penetrations for refrigerant pipes instead of ducts.

Currently, some variable refrigerant flow systems utilize an in-line filter to protect critical components from being damaged by debris. The filter is brazed into the system and cannot be serviced. For example, if the filter gets clogged, the entire refrigerant system must be serviced which is time consuming, expensive, and may require the loss of the heating and cooling during that time. Furthermore, current variable refrigerant flow systems require brazing in order to connect lines and are difficult and time consuming to assemble.

Thus, there has been a long-felt need for a variable refrigerant flow system that allows for quick assembly and disassembly of lines and filters.

SUMMARY

The present disclosure is directed to one or more exemplary embodiments of a variable refrigerant flow assembly.

In an exemplary embodiment, the variable refrigerant flow assembly comprises a housing including a first wall, the first wall comprising a first hole, a piping network arranged in the housing, the piping network including at least one valve and at least one manifold, a first tube connected to the manifold and extending through the first hole, a connector body removably connectable to the first tube, including a first end arranged to engage the first tube, a second end, a first through-bore extending from the first end to the second end, a first radially inward facing surface, and a first radially outward facing surface, and a filter removably arranged in the connector body.

In an exemplary embodiment, the variable refrigerant flow assembly further comprises a second tube connected to the manifold, the second tube extending through a second hole in the first wall. In an exemplary embodiment, the connector body further comprises a groove arranged in the radially outward facing surface proximate the first end, a plurality of apertures extending from the groove to the first through-bore, and a retaining ring arranged in the groove, the retaining ring including protrusions that extend through the apertures and into the first through-bore. In an exemplary embodiment, the first tube comprises shoulder, the shoulder operatively arranged to engage the retaining ring to removably connect the connector body to the first tube. In an exemplary embodiment, the filter is axially arranged between an end of the first tube and a surface of the connector body.

In an exemplary embodiment, the connector body is removably connected to the first tube via threading. In an exemplary embodiment, the variable refrigerant flow assembly further comprises a second tube removably connectable to the second end of the connector body. In an exemplary embodiment, the second tube comprises a shoulder operatively arranged to engage the second end, and the connector body further comprises a groove. In an exemplary embodiment, the variable refrigerant flow assembly further comprises a retainer including a first flange arranged to engage the groove to secure the retainer to the connector body, and a second flange arranged to engage the shoulder to secure the second tube to the connector body. In an exemplary embodiment, the retainer comprises a first section and a second section pivotably connected to the first section. In an exemplary embodiment, the tube comprises a first groove the first radially inward facing surface comprises a second groove, and a retainer is arranged in the first groove and operatively arranged to engage the second groove to secure the tube in the connector body.

In an exemplary embodiment, the filter is engaged with a frusto-conical radially inward facing surface in the connector body. In an exemplary embodiment, the filter is engaged with an axial surface in the connector body. In an exemplary embodiment, the filter comprises a second radially inward facing surface, a second radially outward facing surface, and a wall comprising a plurality of holes, wherein the second radially inward facing surface and the wall form a cavity. In an exemplary embodiment, the filter further comprises a protrusion extending radially outward from the second radially outward facing surface. In an exemplary embodiment, the second radially inward facing surface is frusto-conical.

The present disclosure is directed to one or more exemplary embodiments of a variable refrigerant flow assembly.

In an exemplary embodiment, the variable refrigerant flow assembly comprises a housing including a first wall, a piping network arranged in the housing, the piping network including at least one valve and at least one manifold, a plurality of fluid connection assemblies connected to the at least one manifold, each fluid connection assembly of the plurality of fluid connection assemblies comprising a first tube connected to the manifold and extending through a hole in the first wall, a connector body removably connectable to the first tube, each connector body including a first end arranged to engage the first tube, a second end, a first through-bore extending from the first end to the second end, a first radially inward facing surface, and a first radially outward facing surface, and a filter removably arranged in the connector body, the filter including a second radially inward facing surface, a second radially outward facing surface, a wall comprising a plurality of holes, and a protrusion extending radially outward from the second radially outward facing surface, the protrusion engageable with a surface in the connector body.

In an exemplary embodiment, the second radially inward facing surface comprises a frusto-conical surface. In an exemplary embodiment, each fluid connection assembly of the plurality of fluid connection assemblies comprises a second tube, and a retainer for removably connecting the second tube to the connector body.

The present disclosure is directed to one or more exemplary embodiments of a fluid connection assembly.

In an exemplary embodiment, the fluid connection assembly comprises a connector body, including a first end, a second end, a through-bore extending from the first end to the second end, a first radially outward facing surface including a first groove, a second radially outward facing surface including a second groove, a first radially inward facing surface, and a second radially inward facing surface, a first retainer arranged in the first groove, the first retainer including a plurality of protrusions extending into the through-bore, a second retainer including a first flange engaged with the second groove and a second flange axially spaced from the first flange, and a filter removably arranged in the through-bore at least partially axially between the first radially inward facing surface and the second radially inward facing surface.

These and other objects, features, and advantages of the present disclosure will become readily apparent upon a review of the following detailed description of the disclosure, in view of the drawings and appended claims.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure, in which corresponding reference symbols indicate corresponding parts. However, the drawings do not illustrate all possible implementations of the presently disclosed subject matter and are not intended to limit the scope of the present disclosure in any way.

DETAILED DESCRIPTION

Figure 1A:
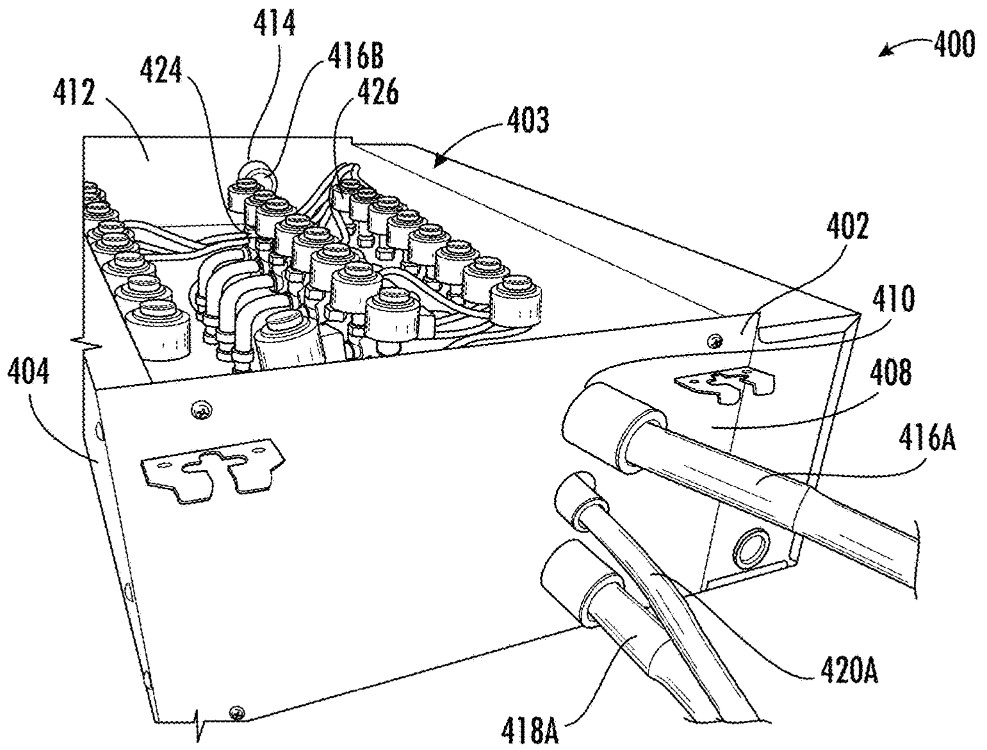
FIG. 1A is a top side perspective view of a variable refrigerant flow assembly.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

Where used herein, the terms "first," "second," and so on, do not necessarily denote any ordinal, sequential, or priority relation, but are simply used to more clearly distinguish one element or set of elements from another, unless specified otherwise.

Where used herein, the term "about" when applied to a value is intended to mean within the tolerance range of the equipment used to produce the value, or, in some examples, is intended to mean plus or minus 10%, or plus or minus 5%, or plus or minus 1%, unless otherwise expressly specified.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "substantially" is intended to mean values within ten percent of the specified value.

Where used herein, the term "exemplary" is intended to mean "an example of," "serving as an example," or "illustrative," and does not denote any preference or requirement with respect to a disclosed aspect or embodiment.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or a device comprising a second element and a third element. A similar interpretation is intended when the phrase "used in at least one of." is used herein.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

Figure 1B:
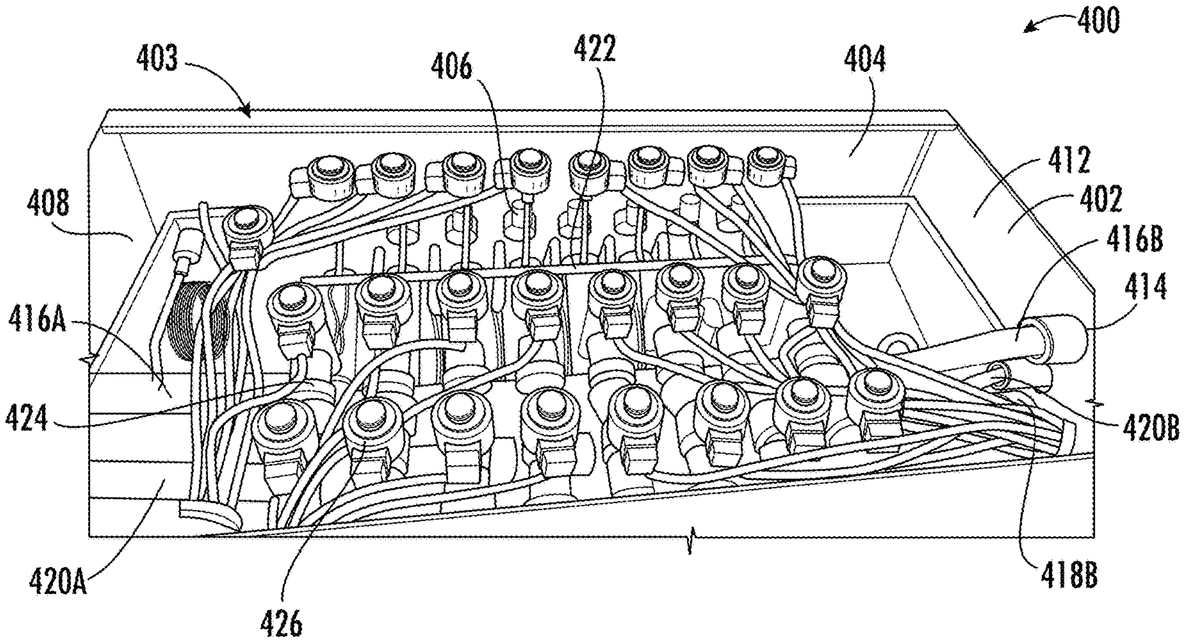
FIG. 1B is a top front perspective view of the variable refrigerant flow assembly shown in FIG. 1A.
Figure 1C:
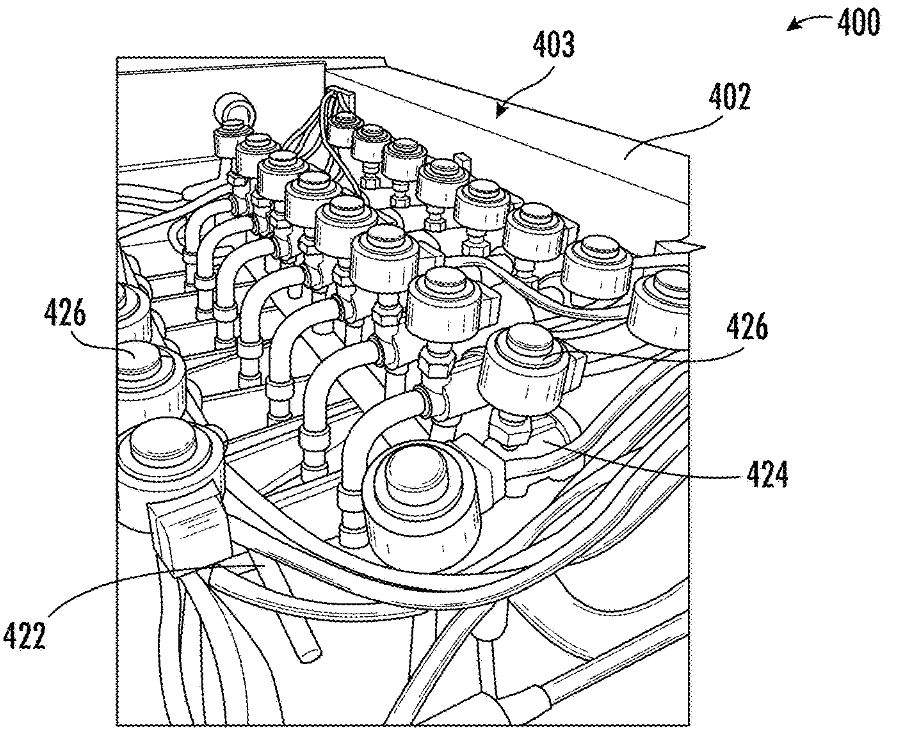
FIG. 1C is a top side perspective view of the variable refrigerant flow assembly shown in FIG. 1A.
Figure 1D:
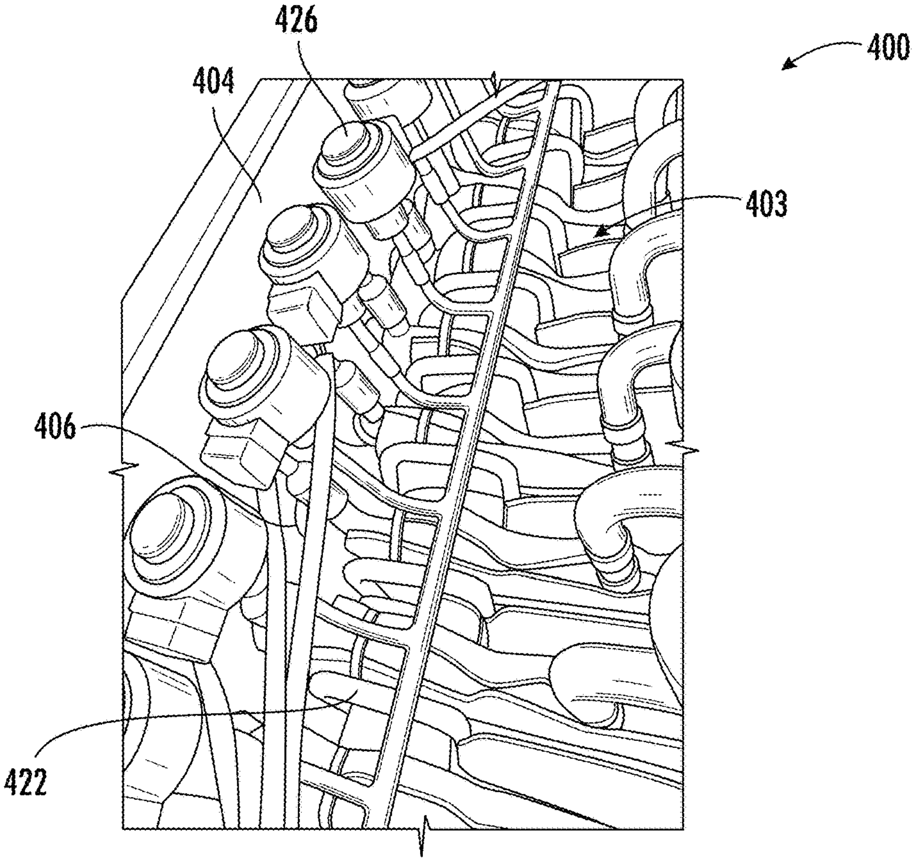
FIG. 1D is a top front perspective view of the variable refrigerant flow assembly shown in FIG. 1A.

Referring now to the figures, FIG. 1A is a top side perspective view of variable refrigerant flow assembly 400. FIG. 1B is a top front perspective view of variable refrigerant flow assembly 400. FIG. 1C is a top side perspective view of variable refrigerant flow assembly 400. FIG. 1D is a top front perspective view of variable refrigerant flow assembly 400. Variable refrigerant flow assembly 400 generally comprises housing 402 and piping network 403 arranged in housing 402.

Housing 402 comprises a plurality of walls, for example, wall 404, wall 408, and wall 412. Wall 404 comprises plurality of holes 406 through which tubes 20 extend, as will be described in greater detail below. Wall 408 comprises plurality of holes 410 through which tubes 416A, 418A, and 420A extend. In an exemplary embodiment, tube 416A is an inlet or a supply tube for high pressure gas (e.g., refrigerant) into piping network 403. In an exemplary embodiment, tube 418A is an inlet or supply tube for low pressure gas (e.g., refrigerant) into piping network 403. In an exemplary embodiment, tube 420A is an inlet or a supply tube for liquid (e.g., refrigerant) into piping network 403. Wall 412 comprises plurality of holes 414 through which tubes 416B, 418B, and 420B extend. In an exemplary embodiment, tube 416B is an outlet or a return tube for high pressure gas (e.g., refrigerant) from piping network 403. In an exemplary embodiment, tube 418B is an outlet or a return tube for low pressure gas (e.g., refrigerant) from piping network 403. In an exemplary embodiment, tube 420B is an outlet or return tube for liquid (e.g., refrigerant) from piping network 403. In an exemplary embodiment, the refrigerant is supplied from and returned to one or more condensing units (not shown).

Piping network 403 comprises a plurality of tubes fluidly connected to at least one manifold 422 and valves 424. Valves 424 are operatively arranged to direct fluid through the plurality of tubes and at least one manifold. For example, valves 424 are arranged to direct liquid refrigerant, high pressure gas refrigerant, and/or low pressure refrigerant to manifold 422 based on the requirement of the destination thermostat (i.e., heating or cooling, the degree of heating or cooling, etc.). In an exemplary embodiment, valves 424 are controlled by actuators 426. Actuators 426 may receive signals, for example from destination thermostats, and adjust valves 426 accordingly to distribute the proper fluid and/or amount of fluid to HVAC components associated with that destination thermostat. In an exemplary embodiment, one or more actuators 426 may comprise a stepper motor.

Figure 2A:
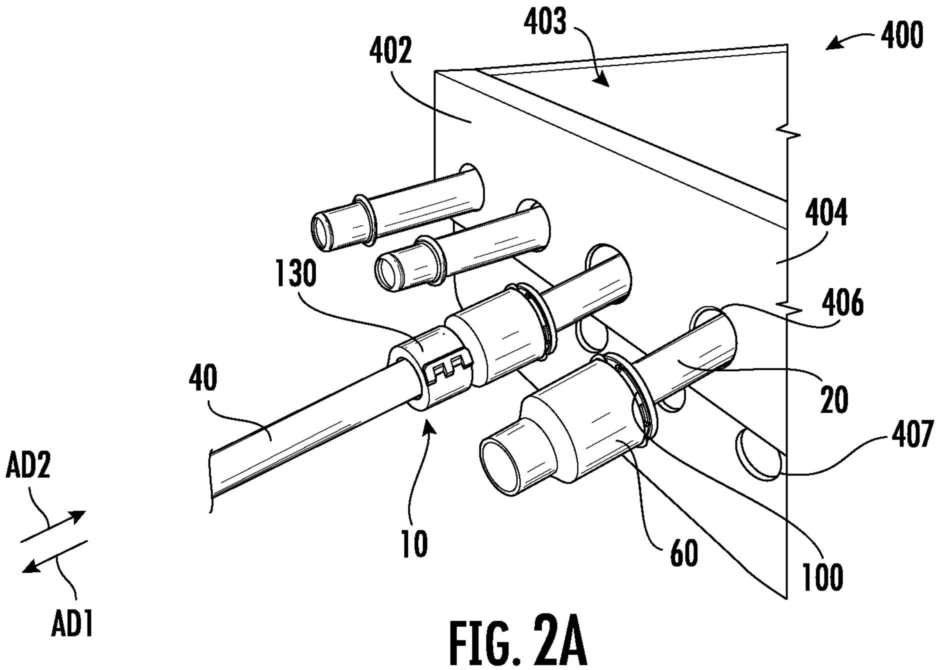
FIG. 2A is a rear top perspective view of the variable refrigerant flow assembly shown in FIG. 1A.
Figure 2B:
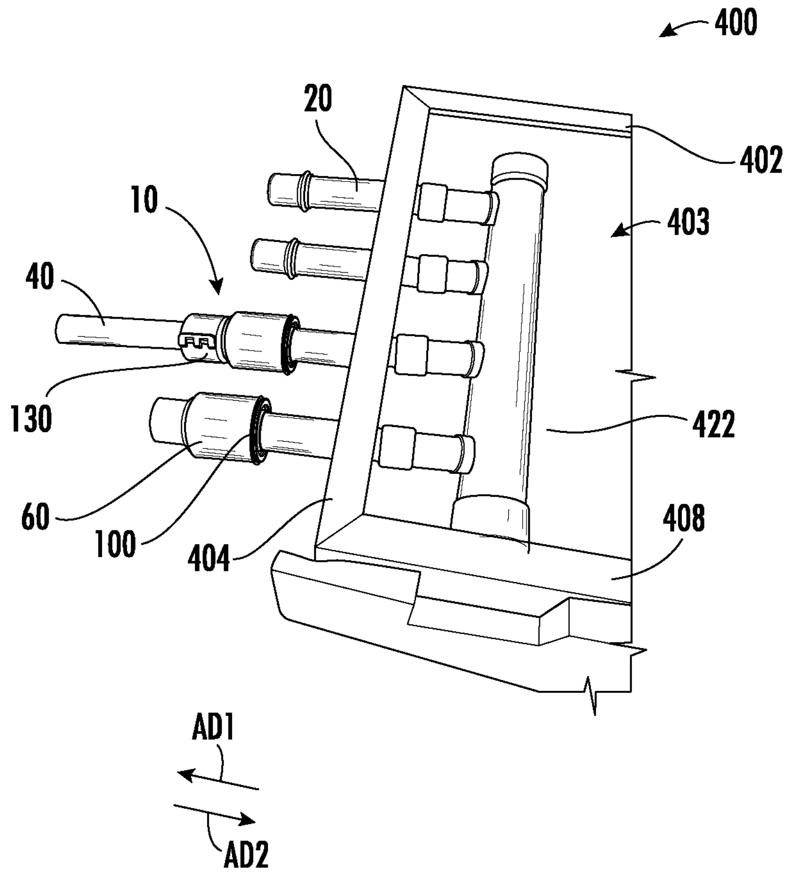
FIG. 2B is a top side perspective view of the variable refrigerant flow assembly shown in FIG. 1A.

FIG. 2A is a rear top perspective view of variable refrigerant flow assembly 400. FIG. 2B is a top side perspective view of variable refrigerant flow assembly 400. It should be appreciated that FIGS. 2A-2B have been simplified to remove a number of pipes of piping network 403, valves 424, and actuators 426 for easier viewing. As shown, fluid connection assembly 10, 210 are connected to manifold 422. Specifically, pipes 20 extend through-holes 406 in wall 404 and are connected to manifold 422. In an exemplary embodiment, pipes 20 are connected to a plurality of manifolds, wherein some pipes 20 are connected to the same manifold and other pipes are connected to different manifolds. In an exemplary embodiment, each of pipes 20 are connected to a different manifold. Refrigerant fluid (gas or liquid) flows into variable refrigerant flow assembly 400 from a refrigerant supply via supply tubes 416A, 418A, and 420A and to destination HVAC components, for example, via one or more pipes 20. The refrigerant fluid returns from the destination HVAC components to variable refrigerant flow assembly 400 via one or more pipes 20, or additional tubes (not shown) that extend through-holes 407 (see FIG. 2A). The refrigerant fluid is then returned to the refrigerant supply from variable refrigerant flow assembly 400 via return tubes 416B, 418B, and 420B.

Fluid connection assemblies 10, 210 facilitate efficient connection of destination lines to variable refrigerant flow assembly 400, as well as efficient serviceability of filters, as will be described in greater detail below.

Figure 3A:
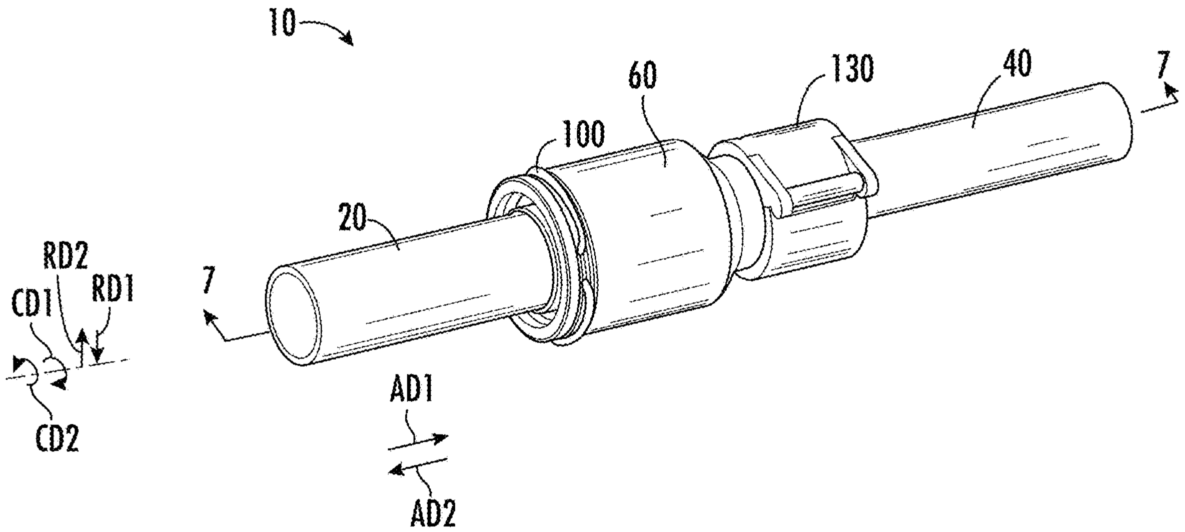
FIG. 3A is a front perspective view of the fluid connection assembly shown in FIG. 2A.
Figure 3B:
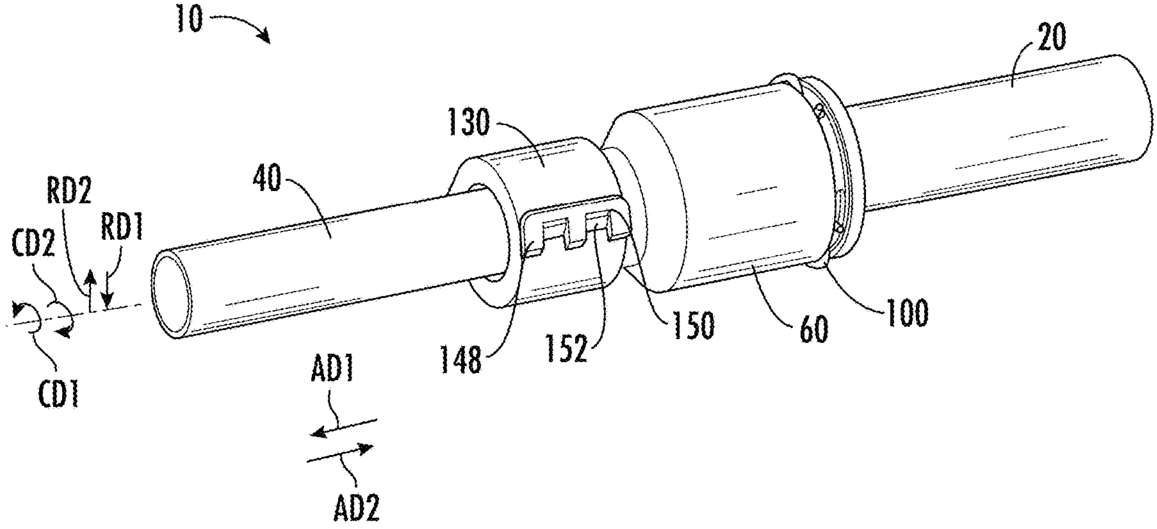
FIG. 3B is a rear perspective view of the fluid connection assembly shown in FIG. 2A.
Figure 4:
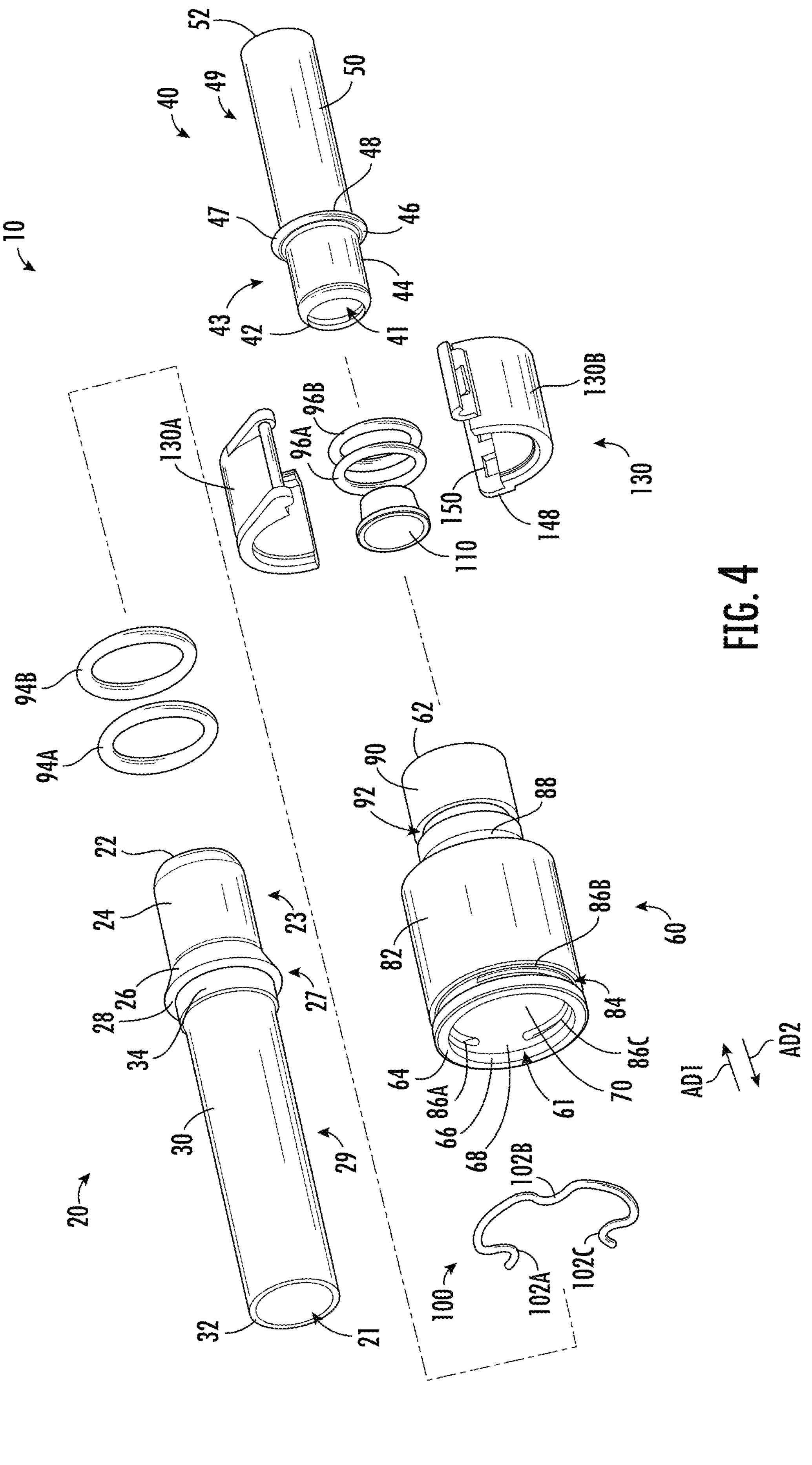
FIG. 4 is an exploded front perspective view of the fluid connection assembly shown in FIG. 2A.
Figure 7:
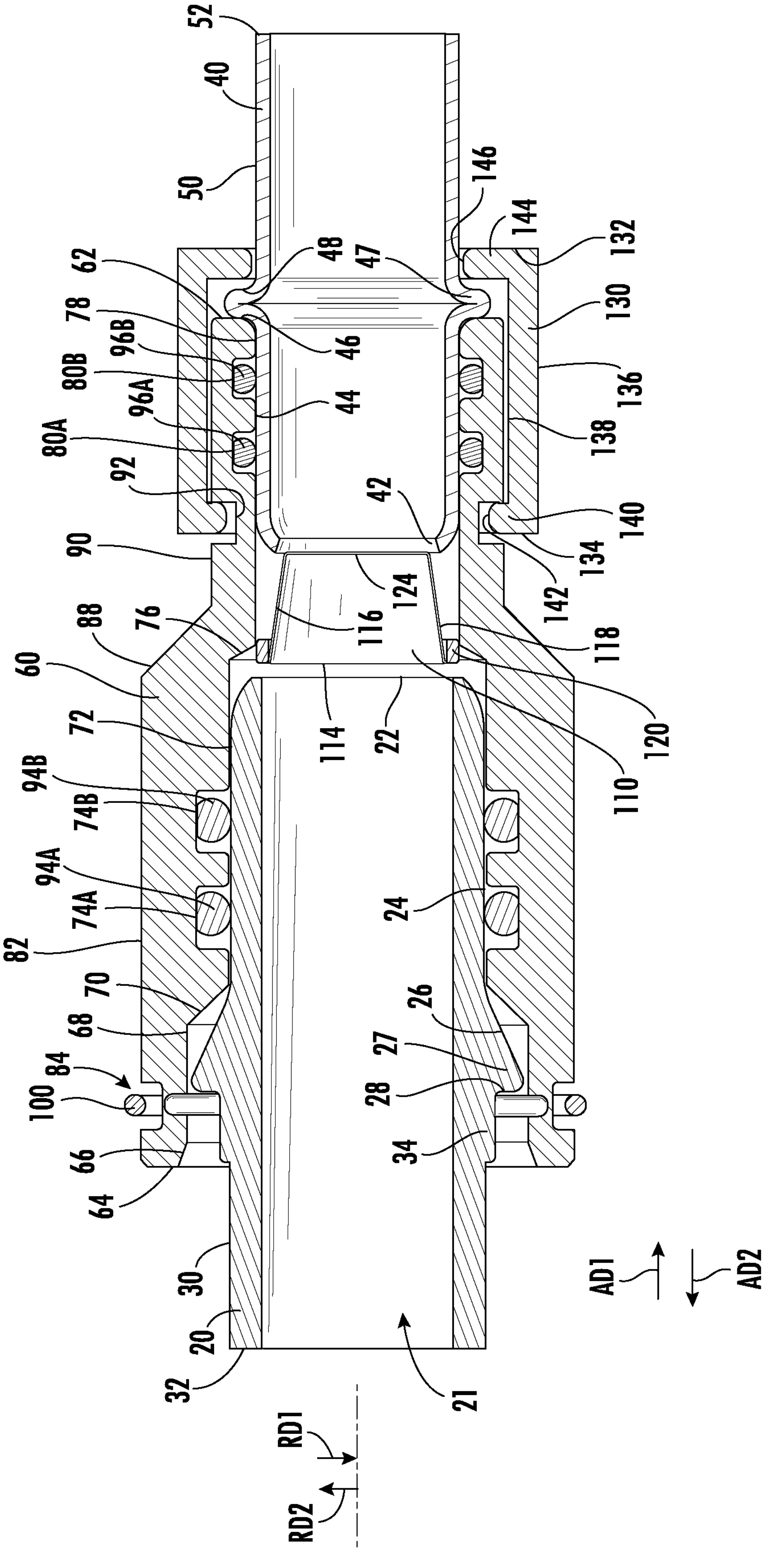
FIG. 7 is a cross-sectional view of the fluid connection assembly taken generally along line 7-7 in FIG. 3A.

FIG. 3A is a front perspective view of fluid connection assembly 10. FIG. 3B is a rear perspective view of fluid connection assembly 10. FIG. 4 is an exploded front perspective view of fluid connection assembly 10. FIG. 7 is a cross-sectional view of fluid connection assembly 10 taken generally along line 7-7 in FIG. 3A. Fluid connection assembly 10 generally comprises connector body 60, retainer 100, and retainer 130. In an exemplary embodiment, fluid connection assembly 10 further comprises at least one tube, for example, tube 20 and tube 40.

Tube 20 comprises end 22, section 23, shoulder 27, section 29, end 32, and through-bore 21. Through-bore 21 extends through tube 20 from end 22 to end 32. Section 23 is arranged between end 22 and shoulder 27 and comprises radially outward facing surface 24. Radially outward facing surface 24 includes a substantially constant diameter. In an exemplary embodiment, radially outward facing surface 24 comprises a frusto-conical or curvilinear taper proximate end 22 (see FIG. 7). Shoulder 27 is arranged between section 23 and section 29 and comprises radially outward facing surface 26 and surface 28. As shown, radially outward facing surface 26 is a frusto-conical surface extending from radially outward surface 24 to surface 28. Radially outward facing surface 26 increases in diameter is axial direction AD2. In an exemplary embodiment, radially outward facing surface 26 is an axial surface facing at least partially in axial direction AD1. In an exemplary embodiment, tube 20 comprises a constant diameter radially outward facing surface arranged between radially outward facing surface 26 and surface 28. Shoulder surface 28 is an axial surface facing at least partially in axial direction AD2. Section 29 is arranged between shoulder 27 and end 32 and comprises radially outward facing surface 30. Radially outward facing surface 30 includes a substantially constant diameter. In an exemplary embodiment, section 29 further comprises a raised section, namely, radially outward facing surface 34, arranged between shoulder surface 28 and radially outward facing surface 30. Radially outward facing surface 34 has a diameter that is greater than the diameter of radially outward facing surface 30.

Tube 20 is arranged to be inserted, specifically with end 22 first, into connector body 60, specifically through-bore 61. Tube 20 is inserted into connector body 60 until section 23, or radially outward facing surface 24, engages one or more seals, for example, seals 94A-94B (see FIG. 7), and shoulder 27 axially clears retaining clip 100 (i.e., shoulder 27 is arranged on the right side of retaining clip 100 as shown in FIG. 7). It is the engagement of protrusions 102A-102C with shoulder surface 28 that secures tube 20 within connector body 60. It should be appreciated that tube 20 may be any traditional tube or tube end form comprising a bead, radially outward extending protrusion or flange, or ramp profile, which extends radially outward and axially on the outer surface of the tube, to secure the tube within the connector body. In an exemplary embodiment, tube 20 comprises a metal. In an exemplary embodiment, tube 20 comprises a nonmetal (e.g., polymer, rubber, ceramic, etc.).

Connector body 60 comprises through-bore 61 extending from end 62 to end 64, one or more radially inward facing surfaces, for example, radially inward facing surface 68, radially inward facing surface 72, and radially inward facing surface 78, and one or more radially outward facing surfaces, for example, radially outward facing surface 82 and radially outward facing surface 90. Connector body 60 is arranged to be connected to a component that is filled with a fluid or through which fluid flows, for example, variable refrigerant flow assembly 400 and/or tube 20.

Radially inward facing surface 68 is a cylindrical surface that extends from end 64 to radially inward facing surface 72 in axial direction AD1. In an exemplary embodiment, radially inward facing surface 68 is connected to end 64 via frusto-conical radially inward facing surface 66. Radially inward facing surface 66 increases in diameter in axial direction AD2. In an exemplary embodiment, radially inward facing 68 is connected to radially inward facing surface 72 via surface 70. In an exemplary embodiment, surface 70 is a frusto-conical radially inward facing surface that increases in diameter in axial direction AD2. In an exemplary embodiment, surface 70 is an axial surface facing in axial direction AD2.

Seals 94A-94B are arranged in connector body 60. Specifically, seal 94A is arranged in groove 74A and seal 94B is arranged in groove 74B. Grooves 74A-74B are arranged in radially inward facing surface 72. In an exemplary embodiment, seal 94A and/or seal 94B is an O-ring. In an exemplary embodiment, groove 74A is spaced apart from groove 74B. In an exemplary embodiment, radially inward facing surface 72 comprises only one groove, and two seals are arranged in the single groove (e.g., two O-rings stacked on top of one another). In an exemplary embodiment, radially inward facing surface 72 is a cylindrical surface that extends from radially inward facing surface 68, or surface 70, to radially inward facing surface 78. In an exemplary embodiment, radially inward facing surface 72 is connected to radially inward facing surface 78 via surface 76. In an exemplary embodiment, surface 76 is a frusto-conical surface that increases in diameter in axial direction AD2. In an exemplary embodiment, surface 76 is an axial surface facing in axial direction AD2.

Seals 96A-96B are arranged in connector body 60. Specifically, seal 96A is arranged in groove 80A and seal 96B is arranged in groove 80B. Grooves 80A-80B are arranged in radially inward facing surface 78. In an exemplary embodiment, seal 96A and/or seal 96B is an O-ring. In an exemplary embodiment, groove 80A is spaced apart from groove 80B. Radially inward facing surface 78 is a cylindrical surface extending from radially inward facing surface 72, or surface 76, to end 62. In an exemplary embodiment, radially inward facing surface 72 comprises a first diameter and radially inward facing surface 78 comprises a second diameter, wherein the first diameter is greater than the second diameter. As such, connector body 60 allows for the tube diameter to be decreases (or increased) based on the supply requirement of the destination HVAC components. In particular, fluid connection assembly 10 allows for various size supply tubes 40 to be used without the need for altering output tubes 20 and/or variable refrigerant flow assembly 400.

Radially outward facing surface 82 extends from end 64 to radially outward facing surface 90. Groove 84 is arranged in radially outward facing surface 82. Groove 84 is arranged axially between and spaced apart from end 64 and radially outward facing surface 90. In an exemplary embodiment, groove 84 is axially aligned with radially inward facing surface 68. Groove 84 further comprises apertures 86A-86C arranged circumferentially thereabout. Apertures 86A-86C extend from radially outward facing 82 to through-bore 61. Groove 84 is operatively arranged to engage retaining clip 100, as will be described in greater detail below. In an exemplary embodiment, connector body 60 comprises a metal. In an exemplary embodiment, connector body 60 comprises a nonmetal (e.g., polymer, ceramic, rubber).

Retaining clip or retaining ring or snap clip/ring 100 is arranged in groove 84 in connector body 60. Retaining clip 100 is generally ring-shaped including one or more protrusions extending radially inward. In the embodiment shown, retaining clip 100 comprises protrusions 102A-102C. Protrusions 102A-102C extend radially inward through apertures 86A-86C in groove 84. Protrusions 102A-102C are arranged to engage shoulder 27, specifically, surface 28, to secure tube 20 within connector body 60. Retaining clip 100 may comprise any material that is capable of elastically deforming and returning to its original shape (e.g., metal, polymer, etc.).

In an exemplary embodiment, radially outward facing surface 82 is connected to radially outward facing surface 90 via surface 88. In an exemplary embodiment, surface 88 is a frusto-conical radially outward facing surface that increases in diameter in axial direction AD2. In an exemplary embodiment, surface 88 is an axial surface facing in axial direction AD1. Radially outward facing surface 90 is a cylindrical surface extending from end 62 to radially outward facing surface 82, or surface 88. Radially outward facing surface 90 is arranged to engage retainer 130. Groove 92 is arranged in radially outward facing surface 90 and is arranged to engage flange 142 of retainer 130, as will be described in greater detail below. In an exemplary embodiment, groove 92 is arranged axially between and spaced apart from radially outward facing surface 62 and surface 88.

Tube 40 comprises end 42, section 43, bead or shoulder 47, section 49, end 52, and through-bore 41. Through-bore 41 extends through tube 40 from end 42 to end 52. Section 43 is arranged between end 42 and shoulder 47 and comprises radially outward facing surface 44. Radially outward facing surface 44 includes a substantially constant diameter. In an exemplary embodiment, radially outward facing surface 44 comprises a frusto-conical taper or curvilinear surface proximate end 42 (see FIG. 7).

Shoulder 47 is arranged between section 43 and section 49 and comprises surface 46 and surface 48. In an exemplary embodiment, surface 46 is an axial surface facing at least partially in axial direction AD2 and surface 48 is an axial surface facing at least partially in axial direction AD1. In an exemplary embodiment, surface 46 is a frusto-conical surface extending from the radially outward facing surface of shoulder 47 radially inward in axial direction AD2. For example, surface 46 may be a linear conical shape increasing in diameter in axial direction AD1. In an exemplary embodiment, surface 46 may comprise a linear portion and a conical or frusto-conical portion. Shoulder 47 comprises a radially outward facing surface. In an exemplary embodiment, the radially outward facing surface of shoulder 47 comprises a constant diameter. In an exemplary embodiment, the radially outward facing surface of shoulder 47 comprises a variable diameter. Section 49 is arranged between shoulder 47 and end 52 and comprises radially outward facing surface 50. Radially outward facing surface 50 includes a substantially constant diameter.

Tube 40 is arranged to be inserted, specifically with end 42 first, into connector body 60. Tube 40 is inserted into connector body 60 until section 43, or radially outward facing surface 44, engages radially inward facing surface 78 and surface 46 is arranged proximate to and/or engages end 62. Retainer 130 is then secured over shoulder 47, as will be described in greater detail below. Seals 96A-96B sealingly engage radially outward facing surface 44 and forms a fluid-tight seal between tube 40 and connector body 60 (see FIG. 7). It should be appreciated that tube 40 may be any traditional tube or tube end form comprising a bead, radially outward extending protrusion or flange, or ramp profile, which extends radially outward and axially on the outer surface of the tube, to secure the tube within the connector body. In an exemplary embodiment, tube 40 comprises a metal. In an exemplary embodiment, tube 40 comprises a nonmetal (e.g., polymer, ceramic, rubber).

Figure 5:
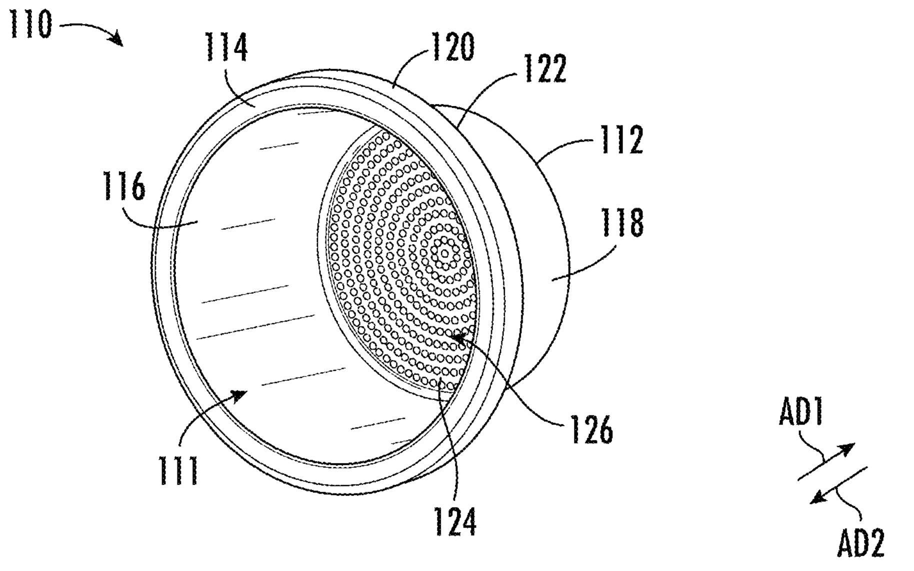
FIG. 5 is a perspective view of the filter shown in FIG. 4.

FIG. 5 is a perspective view of filter 110. Filter 110 comprises end 112, end 114, radially inward facing surface 116, radially outward facing surface 118, and wall or end portion 124. Radially inward facing surface 116 and wall 124 form cavity 111, which extends from end 114 generally in axial direction AD1. Wall 124 comprises a plurality of holes 126 extending therethrough. In an exemplary embodiment, wall 124 is a sieve or strainer. In an exemplary embodiment, wall 124 is flexible. In an exemplary embodiment, wall 124 is rigid. In an exemplary embodiment, wall 124 is a mesh screen. It should be appreciated that wall 124 may comprise any geometry suitable for filtering fluid flowing through filter 110, for example, circular, ovular, ellipsoidal, square, rectangular, triangular, etc.

Filter 110 is arranged to remove debris from fluid flowing through connector body 60, and thus variable refrigerant flow assembly 400. In an exemplary embodiment, filter 110 is generally cylindrical and comprises radially outward extending protrusion or lip 120. Protrusion 120 extends radially outward from radially outward facing surface 118, and is operatively arranged to engage a surface of connector body 60, for example, surface 76. In an exemplary embodiment, protrusion 120 is axially aligned with end 114. In an exemplary embodiment, radially inward facing surface 116 is a frusto-conical surface increasing in diameter in axial direction AD2. In an exemplary embodiment, radially outward facing surface 118 is a frusto-conical surface increasing in diameter in axial direction AD2. In an exemplary embodiment, filter 110 is removably connected to connector body 60. For example, in such exemplary embodiments, filter 110 can be removed from connector body 60 by removing tube 20 from connector body 60 (or removing connector body 60 from tube 20), without the need to remove tube 40 from connector body 60. Additionally, filter 110 can be removed from connector body 60 without the need to shut down fluid transfer through other connector bodies 60 (i.e., the valve 424 corresponding to that connector body 60 is closed without the need to shut down variable refrigerant flow assembly 400 completely). In an exemplary embodiment, filter 110 is disc shaped, a screen with springs, or any other filtering element suitable for filtering fluid traveling therethrough. In an exemplary embodiment, filter 110 is biased in an axial direction by a spring such that filter 110 is displaceable in the even it gets clogged.

Figure 6:
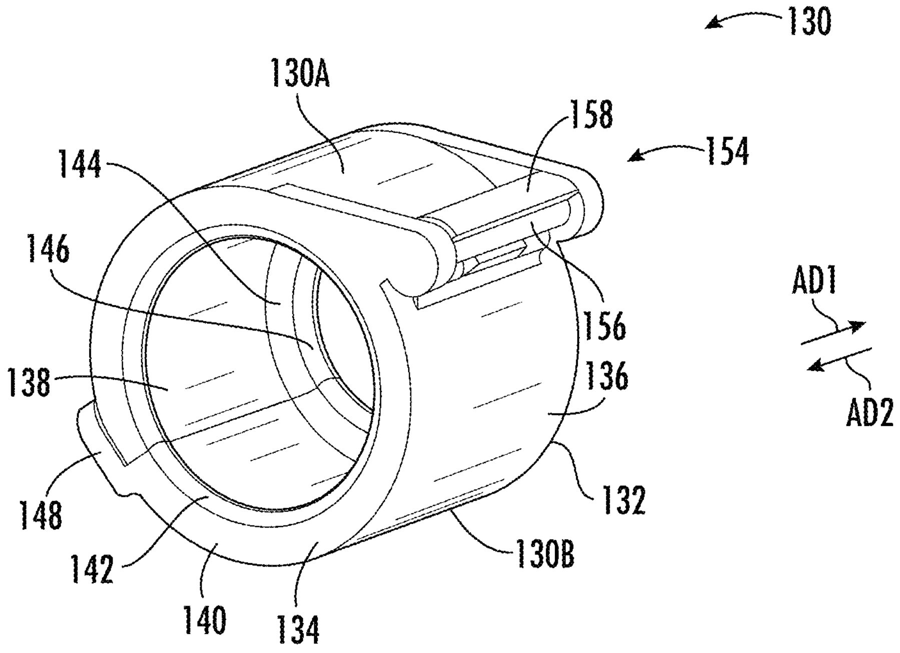
FIG. 6 is a perspective view of the retainer shown in FIG. 2A.

FIG. 6 is a perspective view of retainer 130. Retainer 130 comprises end 132, end 134, radially outward facing surface 136, and radially inward facing surface 138. Flange 140 extends radially inward from radially inward facing surface 138 at end 134. Flange 140 comprises radially inward facing surface 142. Flange 140 is operatively arranged to engage groove 92 to connect retainer 130 to connector body 60 (see FIG. 7). Flange 144 extends radially inward from radially inward facing surface 138 at end 132. Flange 144 comprises radially inward facing surface 146. Flange 144 is operatively arranged to engage shoulder 47 to connect tube 40 to connector body 60 (see FIG. 7).

In an exemplary embodiment, retainer 130 comprises section 130A and section 130B pivotably connected to section 130A. For example, section 130A may be connected to section 130B via hinge 154. One of section 130A and section 130B comprises female hinge component 158 and the other of section 130A and section 130B comprises male hinge component 156 rotatably connected to female hinge component 158. In an exemplary embodiment, one of section 130A and section 130B comprises a female connector, for example plate 148 including one or more holes 150, and the other of section 130A and section 130B comprises a male connector, for example one or more projections 152. Plate 148 extends radially outward and circumferentially from radially outward facing surface 136. Projections 152 are operatively arranged to engage holes 150 to secure section 130B to section 130A. In an exemplary embodiment, in the locked state of retainer 130, plate 148 extends circumferentially from section 130B and overlaps section 130A.

To assemble fluid connection assembly 10, filter 110 is arranged in connector body 60, for example, within through-bore 61. In an exemplary embodiment, protrusion 120 is engaged with surface 76 and radially outward facing surface 118 extends in axial direction AD1 (i.e., wall 124 is axially aligned with radially inward facing surface 78 as shown in FIG. 7). In an exemplary, protrusion 120 is engaged with surface 76 and radially outward facing surface 118 extends in axial direction AD2 (i.e., wall 124 is axially aligned with radially inward facing surface 72).

Retaining clip 100 is arranged on connector body 60 such that it is engaged with groove 84 and protrusions 102A-102C are engaged with apertures 86A-86C and protrude into through-bore 61. Tube 20 is then inserted in axial direction AD1, with end 22 first, into connector body 60 (or connector body 60 is inserted onto tube 20 in axial direction AD2). Radially outward facing surface 24 engages seal 94A, 94B and section 23 is arranged inside of connector body 60 proximate radially inward facing surface 72. As shoulder 27 engages protrusions 102A-102C, retaining clip 100 expands radially outward in radial direction RD1. Once shoulder 27 clears protrusions 102A-102C (i.e., is arranged axially between protrusions 102A-102C and surface 70), protrusions 102A-102C snap back radially inward in radial direction RD2 to form the connected state. In the connected state, shoulder 27 engages or is arranged proximate surface 70 and/or surface 68. Surface 70 prevents shoulder 27 and thus tube 20 from displacing in axial direction AD1, and protrusions 102A-102C prevent shoulder 27 and thus tube 20 from displacing in axial direction AD2 with respect to connector body 60. As such, the engagement of retainer 100 with connector body 60 and tube 20 prevents displacement of tube 20 in axial directions AD1 and AD2.

Additionally, end 22 is arranged proximate to and/or engages protrusion 120 to secure filter 110 in connector body 60. Protrusion 120 engages surface 76 to prevent displacement of filter 110 in axial direction AD1 and end 22 to prevent displacement of filter 110 in axial direction AD2. Thus, filter 110 is easily securable within connector body 60. Additionally, and as previously stated, to replace filter 110, in the exemplary embodiment shown, tube 20 needs only be removed from connector body 60, after which filter 110 can be removed from connector body 60 and replaced.

Tube 40 is inserted in axial direction AD2, with end 42 first, into connector body 60. Radially outward facing surface 44 engages seal 96A, 96B and section 43 is arranged inside of connector body 60 proximate radially inward facing surface 78. Shoulder 47 is arranged proximate to and/or engaged with end 62. Retainer 130, positioned in opened state, is aligned with connector body 60 and tube 40. Specifically, retainer 130 is arranged in the open state wherein section 130A is separated from section 130B. Flange 140 is aligned with groove 92 and flange 144 is aligned with section 49. Retainer 130 is then closed and projections 152 engage holes 150 to lock sections 130A-130B together. Flange 140 engages groove 92 and flange 144 engages shoulder 47 to secure tube 40 to connector body 60. As such, the engagement of retainer 130 with connector body 60 and tube 40 prevents displacement of tube 40 in axial directions AD1 and AD2.

Figure 8A:
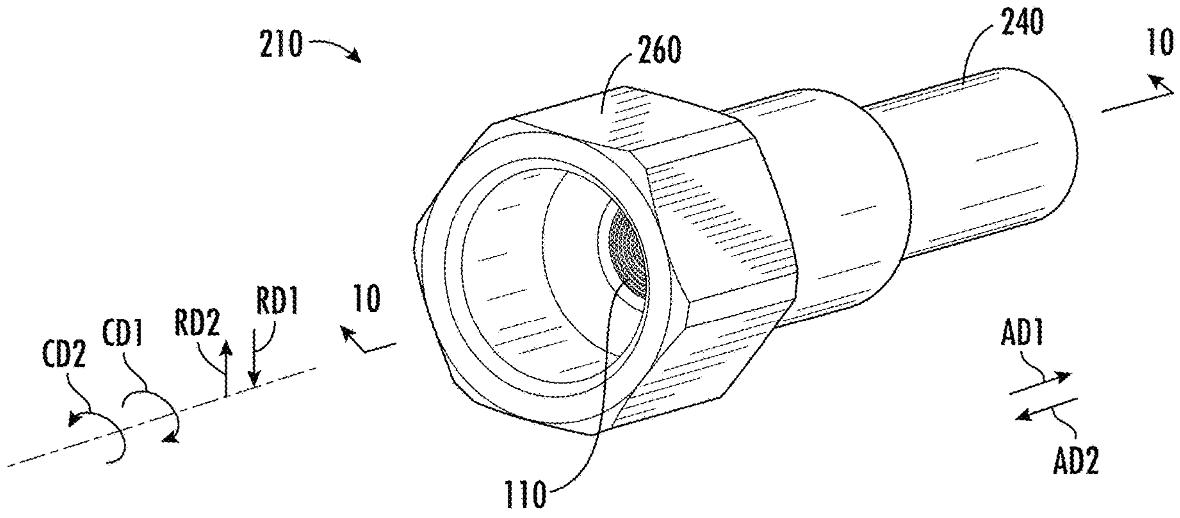
FIG. 8A is a front perspective view of a fluid connection assembly.
Figure 8B:
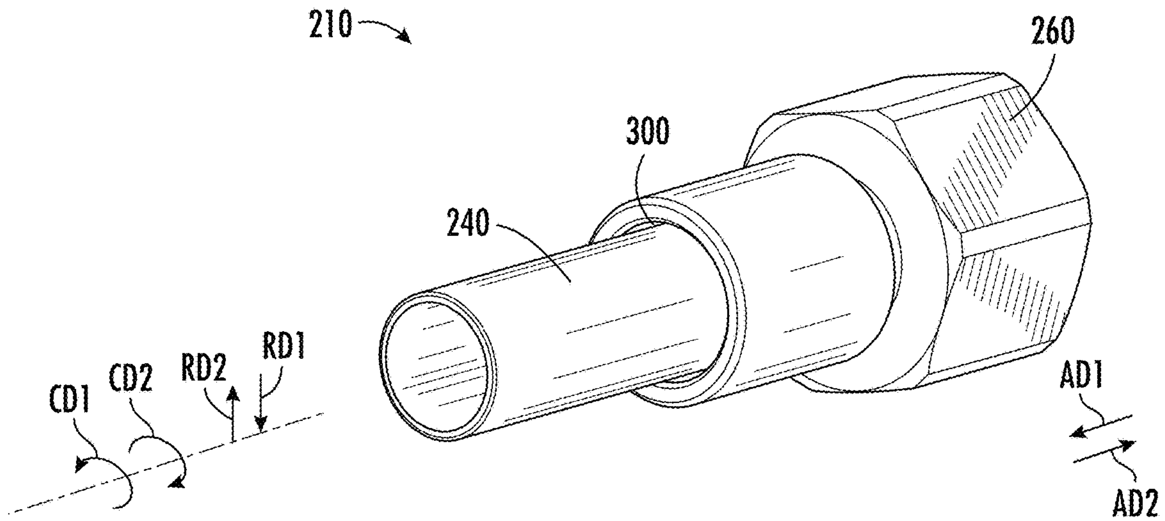
FIG. 8B is a rear perspective view of the fluid connection assembly shown in FIG. 8A.
Figure 9:
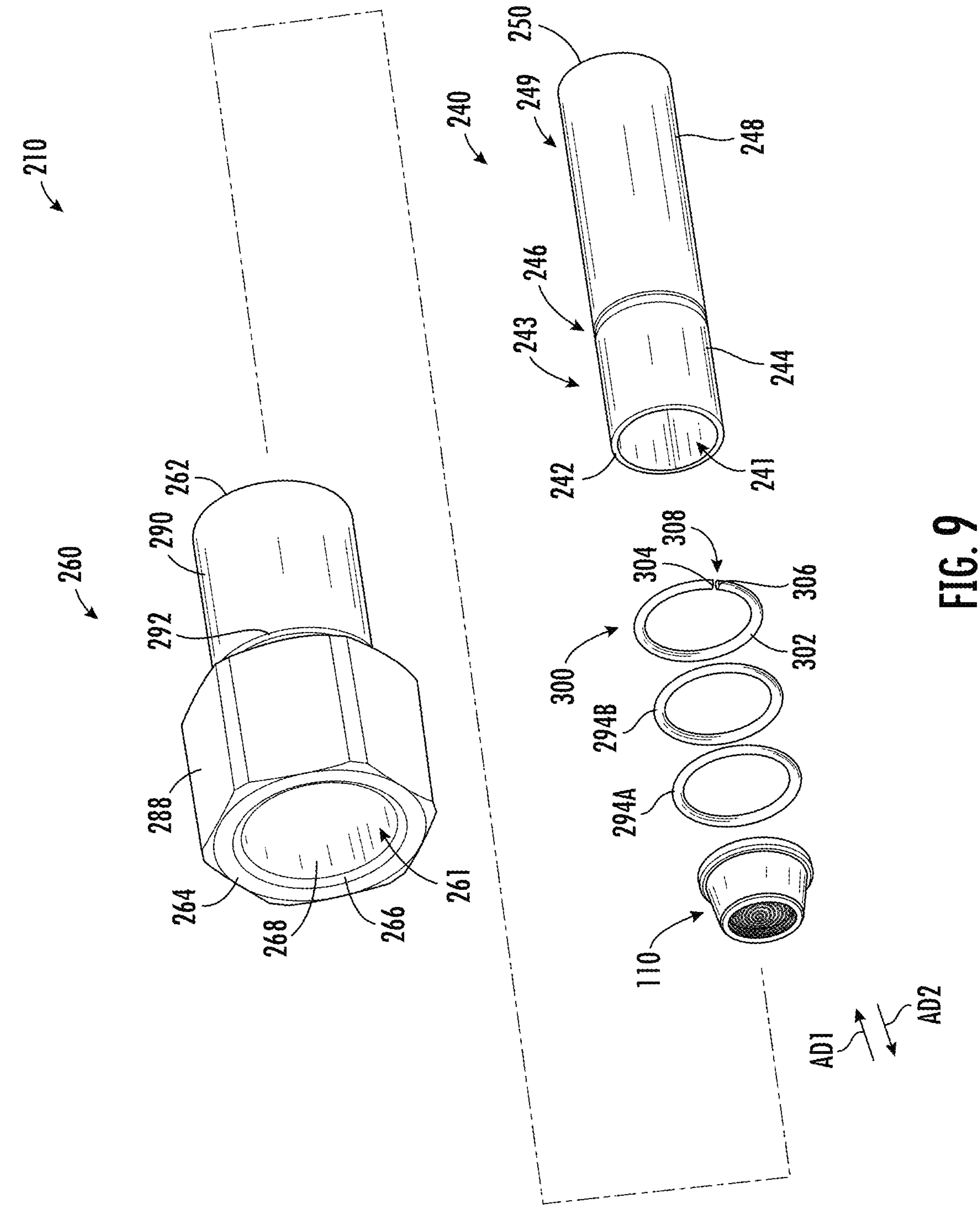
FIG. 9 is an exploded front perspective view of the fluid connection assembly shown in FIG. 8A.
Figure 10:
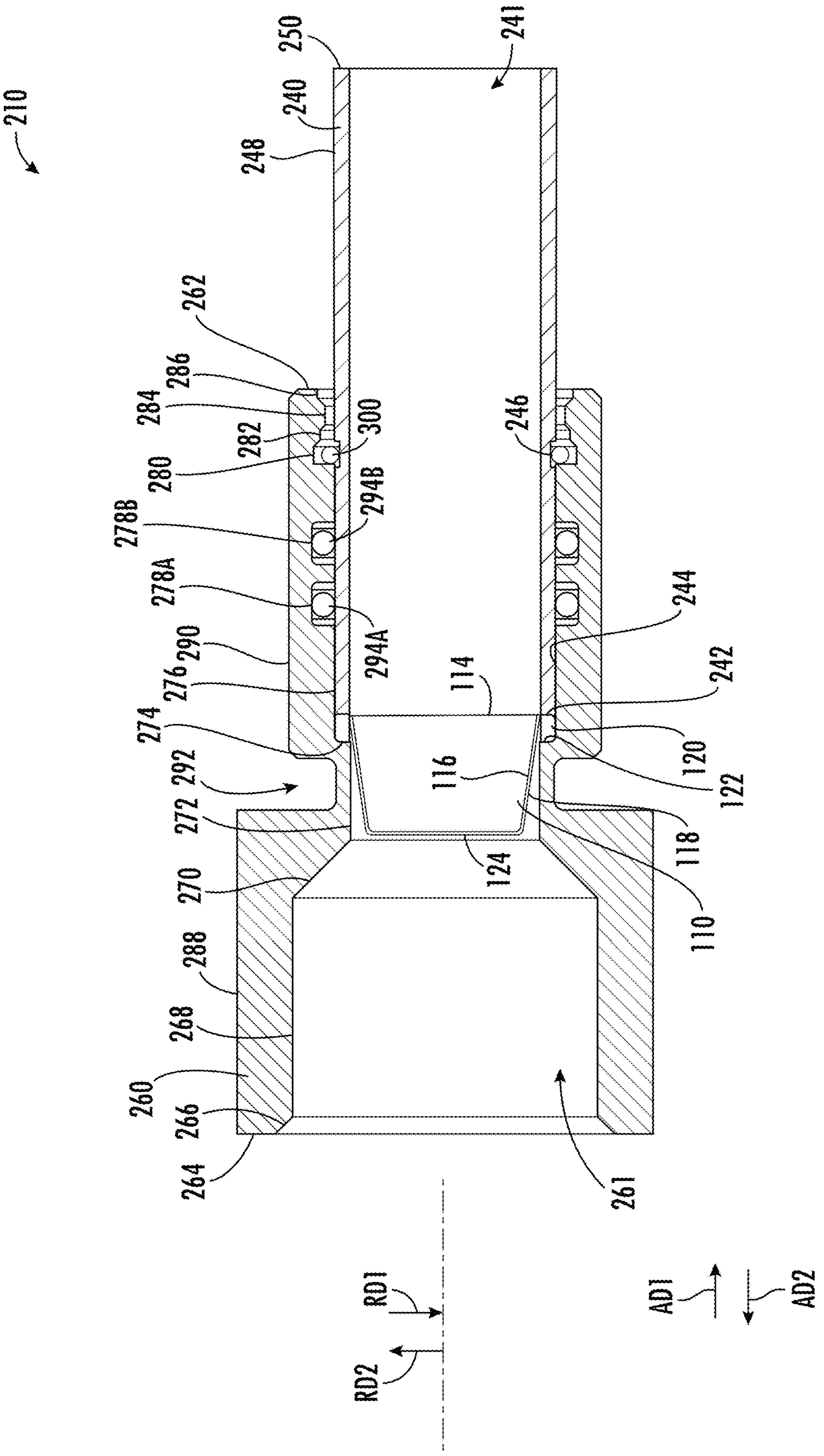
FIG. 10 is a cross-sectional view of the fluid connection assembly taken generally along line 10-10 in FIG. 8A.

FIG. 8A is a front perspective view of fluid connection assembly 210. FIG. 8B is a rear perspective view of fluid connection assembly 210. FIG. 9 is an exploded front perspective view of fluid connection assembly 210. FIG. 10 is a cross-sectional view of fluid connection assembly 210 taken generally along line 10-10 in FIG. 8A.

Connector body 260 comprises through-bore 261 extending from end 262 to end 264, one or more radially inward facing surfaces, for example, radially inward facing surface 268, radially inward facing surface 272, and radially inward facing surface 276, and one or more radially outward facing surfaces, for example, radially outward facing surface 288 and radially outward facing surface 290. Connector body 260 is arranged to be connected to a component that is filled with a fluid or through which fluid flows, for example, variable refrigerant flow assembly 400 and/or tube 20.

Radially inward facing surface 268 is a cylindrical surface that extends from end 264 to radially inward facing surface 272 in axial direction AD1. In an exemplary embodiment, radially inward facing surface 268 is connected to end 264 via frusto-conical radially inward facing surface 266. Radially inward facing surface 266 increases in diameter in axial direction AD2. In an exemplary embodiment, radially inward facing 268 is connected to radially inward facing surface 272 via surface 270. In an exemplary embodiment, surface 270 is a frusto-conical radially inward facing surface that increases in diameter in axial direction AD2. In an exemplary embodiment, surface 270 is an axial surface facing in axial direction AD2.

In an exemplary embodiment, radially inward facing surface 268 comprises threading that corresponds to external threading on tube 20 (not shown). In such exemplary embodiment, connector body 260 is screwed onto tube 20. Connector body 260 may be screwed onto a threaded tube extending from manifold 422 via head 288 (e.g., using a wrench), which is then filled with refrigerant fluid. In an exemplary embodiment, head 288 is hexagonal; however, it should be appreciated that head 288 may comprise any geometry suitable for applying torque to connector body 260. In an exemplary embodiment, connector body 260 may comprise a retainer as opposed to threading for connection to tube 20, for example, similar to that of connector body 60.

Radially inward facing surface 276 extends from radially inward facing surface 272 to end 262. In an exemplary embodiment, radially inward facing surface 276 is connected to radially inward facing surface 272 via surface 274. Surface 274 is an axial surface facing in axial direction AD1. Axial surface 274 is arranged to engage protrusion 120 of filter 110, as will be described in greater detail below. Seals 294A-294B are arranged in connector body 260. Specifically, seal 294A is arranged in groove 278A and seal 294B is arranged in groove 278B. Grooves 278-278B are arranged in radially inward facing surface 276. In an exemplary embodiment, seal 294A and/or seal 294B is an O-ring. In an exemplary embodiment, groove 278A is spaced apart from groove 278B. In an exemplary embodiment, radially inward facing surface 276 comprises only one groove, and two seals are arranged in the single groove (e.g., two O-rings stacked on top of one another).

Radially inward facing surface 276 further comprises groove 280 arranged to engage retainer 300. In an exemplary embodiment, groove 280 is connected to end 262 via a plurality of stepped surfaces. For example, radially inward facing surface 282 is connected to radially inward facing surface 280 via a frusto-conical surface that increases in diameter in axial direction AD2. Radially inward facing surface 282 comprises a smaller diameter than that of radially inward facing surface 280. Radially inward facing surface 284 is connected to radially inward facing surface 282 via a frusto-conical surface that increases in diameter in axial direction AD2. Radially inward facing surface 284 comprises a smaller diameter than that of radially inward facing surface 282. Radially inward facing surface 286 is connected to radially inward facing surface 284 via a frusto-conical surface that increases in diameter in axial direction AD1. Radially inward facing surface 286 comprises a larger diameter than that of radially inward facing surface 284. Radially inward facing surface 286 is directly connected to end 262.

In an exemplary embodiment, radially inward facing surface 268 comprises a first diameter and radially inward facing surface 276 comprises a second diameter, wherein the first diameter is greater than the second diameter. As such, connector body 260 allows for the tube diameter to be decreases (or increased) based on the supply requirement of the destination HVAC components. In particular, fluid connection assembly 210 allows for various size supply tubes 240 to be used without the need for altering output tubes 20 and/or variable refrigerant flow assembly 400. Radially outward facing surface 290 extends from end 262 to head 288 in axial direction AD2. In an exemplary embodiment, radially outward facing surface 290 comprises groove 292.

Retainer 300 comprises annular ring 302 including end 304 and end 306. End 304 is separated from end 306 by circumferential space 308. The separation of end 304 and end 306 allows for radial expansion, and contraction, of retainer 300. Retainer 300 is operatively arranged to engage groove 280 and or radially inward facing surface 282, 284, and groove 246, to secure tube 240 in connector body 260. Retainer 300 may comprise any material that is capable of elastically deforming and returning to its original shape (e.g., metal, polymer, etc.).

Tube 240 comprises end 242, section 243, groove 246, section 249, end 250, and through-bore 241. Through-bore 241 extends through tube 240 from end 242 to end 250. Section 243 is arranged between end 242 and groove 246 and comprises radially outward facing surface 244. Radially outward facing surface 244 includes a substantially constant diameter. In an exemplary embodiment, tube 240 may comprise a curvilinear or frusto-conical surface proximate end 242 (i.e., a tapered nose).

Groove 246 is arranged between section 243 and section 249. Section 49 is arranged between groove 246 and end 250 and comprises radially outward facing surface 248. Radially outward facing surface 248 includes a substantially constant diameter.

Tube 240 is arranged to be inserted, specifically with end 242 first, into connector body 260. Tube 240 is inserted into connector body 260 until section 243, radially outward facing surface 244, engages radially inward facing surface 276, and retainer 300 engages groove 246. Seals 294A-294B sealingly engage radially outward facing surface 244 and forms a fluid-tight seal between tube 240 and connector body 260 (see FIG. 10).

Filter 110 is arranged to remove debris from fluid flowing through connector body 260, and thus variable refrigerant flow assembly 400. Protrusion 120 is operatively arranged to engage a surface of connector body 260, for example, surface 274. In an exemplary embodiment, filter 110 is removably connected to connector body 260. For example, in such exemplary embodiments, filter 110 can be removed from connector body 260 by removing tube 240 from connector body 260, without the need to remove connector body 260 from tube 20. Additionally, in an exemplary embodiment, filter 110 can be removed from connector body 260 without the need to shut down fluid transfer through other connector bodies 260 (i.e., the valve 424 corresponding to that connector body 260 is closed without the need to shut down variable refrigerant flow assembly 400 completely).

To assemble fluid connection assembly 210, filter 110 is arranged in connector body 260, for example, within through-bore 261. In an exemplary embodiment, protrusion 120 is engaged with surface 274 and radially outward facing surface 118 extends in axial direction AD2 (i.e., wall 124 is axially aligned with radially inward facing surface 272 as shown in FIG. 10). In an exemplary, protrusion 120 is engaged with surface 274 and radially outward facing surface 118 extends in axial direction AD1 (i.e., wall 124 is axially aligned with radially inward facing surface 276). Retaining clip 300 is arranged in connector body 260 such that it is engaged with groove 80.

Connector body 260 is connected to tube 20. For example, connector body 260 is screwed on to a threaded tube 20 via head 288, as previously described. It should be appreciated that filter 110 and/or retainer 300 can be assembled in connector body 260 either before or after connector body 260 is connected to tube 20. In an exemplary embodiment, filter 110 is installed in connector body 260 prior to seal 294A, 294B (i.e., so as not to damage seal 294A, 294B). Connector body 260 is now threadably secured to tube 20.

Tube 240 is inserted in axial direction AD2, with end 242 first, into connector body 260. Radially outward facing surface 244 engages seal 294A, 294B and section 243 is arranged inside of connector body 260 proximate radially inward facing surface 276. Retainer 300 engages groove 246 to secure tube 240 to connector body 260. Additionally, end 242 is arranged proximate to and/or abuts against end 114 of filter 110 thereby securing filter 110 in connector body 260. Protrusion 120 engages surface 274 to prevent displacement of filter 110 in axial direction AD2 and end 242 to prevent displacement of filter 110 in axial direction AD1. Thus, filter 110 is easily securable within connector body 260. Additionally, and as previously stated, to replace filter 110, in the exemplary embodiment shown, tube 240 needs only be removed from connector body 260, after which filter 110 can be removed from connector body 260 and replaced.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Fluid connection assembly
20 Tube
21 Through-bore
22 End
23 Section
24 Radially outward facing surface
26 Radially outward facing surface
27 Shoulder
28 Surface
29 Section
30 Radially outward facing surface
32 End
34 Raised portion
40 Tube
41 Through-bore
42 End
43 Section
44 Radially outward facing surface
46 Surface
47 Shoulder
48 Surface
49 Section

50 Radially outward facing surface
52 End
60 Connector body
61 Through-bore
62 End
64 End
66 Radially inward facing surface
68 Radially inward facing surface
70 Radially inward facing surface
72 Radially inward facing surface
74A Groove
74B Groove
76 Radially inward facing surface
78 Radially inward facing surface
80A Groove
80B Groove
82 Radially outward facing surface
84 Groove
86A Aperture
86B Aperture
86C Aperture
88 Radially outward facing surface
90 Radially outward facing surface
92 Groove
94A Seal
94B Seal
96A Seal
96B Seal
100 Retaining clip or retaining ring or snap clip/ring
102A Protrusion
102B Protrusion
102C Protrusion
110 Filter
111 Cavity
112 End
114 End
116 Radially inward facing surface
118 Radially outward facing surface
120 Protrusion
122 Surface
124 Wall or end portion
126 Holes
130 Retainer
130A Section
130B Section
132 End
134 End
136 Radially outward facing surface
138 Radially inward facing surface
140 Flange
142 Radially inward facing surface
144 Flange
146 Radially inward facing surface
148 Female connector or plate
150 Hole(s)
152 Male connector or projection(s)
154 Hinge
156 Male hinge component
158 Female hinge component
210 Fluid connection assembly
240 Tube
241 Through-bore
242 End
243 Section
244 Radially outward facing surface
246 Groove
248 Radially outward facing surface
249 Section
250 End
260 Connector body
261 Through-bore
262 End
264 End
266 Radially inward facing surface
268 Radially inward facing surface
Radially inward facing surface 270
272 Radially inward facing surface
274 Surface
276 Radially inward facing surface
278A Groove
278B Groove
280 Groove
282 Radially inward facing surface
284 Radially inward facing surface
286 Radially inward facing surface
288 Head
290 Radially outward facing surface
292 Groove
294A Seal
294B Seal
300 Retainer
302 Ring portion
304 End
306 End
308 Space
400 Variable refrigerant flow assembly
402 Housing
403 Piping network
404 Wall
406 Holes
407 Through-holes
408 Wall
410 Holes
412 Wall
414 Holes
416A Conduit
416B Conduit
418A Conduit
418B Conduit
420A Conduit
420B Conduit
422 Manifold
424 Valves
426 Actuators
AD1 Axial direction
AD2 Axial direction
CD1 Circumferential direction
CD2 Circumferential direction
RD1 Radial direction
RD2 Radial direction

What is claimed is:

1. A variable refrigerant flow assembly, comprising:
a housing including a first wall, the first wall comprising a first hole;
a piping network arranged in the housing, the piping network including at least one valve and a manifold;
a first tube connected to the manifold and extending through the first hole;
a connector body removably connectable to the first tube, including:
a first end arranged to engage the first tube;
a second end;
a first through-bore extending from the first end to the second end;

a first radially inward facing surface; and
a first radially outward facing surface;
a filter removably arranged in the connector body; and
a second tube removably connectable to the second end of the connector body;
wherein:
one of the first tube and the second tube comprises a first groove;
the first radially inward facing surface comprises a second groove; and
a first retainer is arranged in the first groove and operatively arranged to engage the second groove to secure the one of the first tube and the second tube in the connector body.

2. The variable refrigerant flow assembly as recited in claim 1, further comprising a second tube connected to the manifold, the second tube extending through a second hole in the first wall.

3. The variable refrigerant flow assembly as recited in claim 1, wherein the connector body further comprises:
a groove arranged in the radially outward facing surface proximate the first end;
a plurality of apertures extending from the groove to the first through-bore; and
a retaining ring arranged in the groove, the retaining ring including protrusions that extend through the apertures and into the first through-bore.

4. The variable refrigerant flow assembly as recited in claim 3, wherein the first tube comprises a shoulder, the shoulder operatively arranged to engage the retaining ring to removably connect the connector body to the first tube.

5. The variable refrigerant flow assembly as recited in claim 4, wherein the filter is axially arranged between an end of the first tube and a surface of the connector body.

6. The variable refrigerant flow assembly as recited in claim 1, wherein the connector body is removably connected to the first tube via threading.

7. The variable refrigerant flow assembly as recited in claim 1, wherein:
the other of the first tube and the second tube comprises a shoulder operatively arranged to engage the connector body; and
the connector body further comprises a third groove.

8. The variable refrigerant flow assembly as recited in claim 7, further comprising a second retainer including:
a first flange arranged to engage the third groove to secure the second retainer to the connector body; and
a second flange arranged to engage the shoulder to secure the second tube to the connector body.

9. The variable refrigerant flow assembly as recited in claim 8, wherein the second retainer comprises a first section and a second section pivotably connected to the first section.

10. The variable refrigerant flow assembly as recited in claim 1, wherein the filter is engaged with a frusto-conical radially inward facing surface in the connector body.

11. The variable refrigerant flow assembly as recited in claim 1, wherein the filter is engaged with an axial surface in the connector body.

12. The variable refrigerant flow assembly as recited in claim 1, wherein the filter comprises:
a second radially inward facing surface;
a second radially outward facing surface; and
a wall comprising a plurality of holes;
wherein the second radially inward facing surface and the wall form a cavity.

13. The variable refrigerant flow assembly as recited in claim 12, wherein the filter further comprises a protrusion extending radially outward from the second radially outward facing surface.

14. The variable refrigerant flow assembly as recited in claim 12, wherein the second radially inward facing surface is frusto-conical.

15. A variable refrigerant flow assembly, comprising:
a housing including a first wall;
a piping network arranged in the housing, the piping network including at least one valve and a manifold;
a plurality of fluid connection assemblies connected to the manifold, each fluid connection assembly of the plurality of fluid connection assemblies comprising:
a first tube connected to the manifold and extending through a hole in the first wall;
a connector body removably connectable to the first tube, each connector body including:
a first end arranged to engage the first tube;
a second end;
a first through-bore extending from the first end to the second end;
a first radially inward facing surface; and
a first radially outward facing surface; and
a filter removably arranged in the connector body, the filter including:
an axial wall comprising a plurality of holes;
a lateral wall extending in an axial direction from the axial wall, the lateral wall forming a second radially inward facing surface and a second radially outward facing surface, the lateral wall having no through-holes therein; and
a protrusion extending radially outward from the second radially outward facing surface, the protrusion engageable with a surface in the connector body.

16. The variable refrigerant flow assembly as recited in claim 15, wherein the second radially inward facing surface comprises a frusto-conical surface.

17. The variable refrigerant flow assembly as recited in claim 15, wherein each fluid connection assembly of the plurality of fluid connection assemblies comprises:
a second tube; and
a retainer for removably connecting the second tube to the connector body.

* * * * *